(12) United States Patent
Kumar et al.

(10) Patent No.: US 7,840,072 B2
(45) Date of Patent: Nov. 23, 2010

(54) METHOD AND SYSTEM FOR PATTERN MATCHING

(75) Inventors: Sriram K. N. V. Kumar, Dowaleshwaram (IN); Rama Shankar Mantha, Andhra (IN); Chandrasekhar Sarasvat Revur, Andhra (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 2385 days.

(21) Appl. No.: 10/386,462

(22) Filed: Mar. 13, 2003

(65) Prior Publication Data

US 2004/0199931 A1 Oct. 7, 2004

(51) Int. Cl.
*G06K 9/00* (2006.01)
*G06K 9/48* (2006.01)
*H04N 7/173* (2006.01)

(52) U.S. Cl. .................. 382/181; 382/128; 382/198; 725/119

(58) Field of Classification Search ............... 725/19; 382/181, 198
See application file for complete search history.

(56) References Cited

U.S. PATENT DOCUMENTS 4,122,440 A 10/1978 Langdon, Jr. et al.
5,936,559 A * 8/1999 Howard .................. 341/81

OTHER PUBLICATIONS

Ian H. Witten et al, Arithmetic Coding For Data Compression, Jun. 1987, vol. 30, No. 6, pp. 520-540.

Glen G. Langdon, Jr., An Introduction To Arithmetic Coding, IBM J Res Develp vol. 28 No. 2, Mar. 1984, pp. 135-149.

Tim Bell et al, Pattern Matching In Compressed Text And Images, May 29, 2001, pp. 1-66.

Tim Bell et al., "Pattern Matching in Compressed Text and Images,"Technical Reports, Univ. of Canterbury, http://www.cosc.canterbury.nz/research report/TechReps/2001/tr_0107.pdf., pp. 1-65, May 2001.

Amihood Amir et al., "Efficient Two-Dimensional Compressed Matching," 2nd IEEE Data Compression COnference, pp. 279-288, Mar. 1992.

* cited by examiner

*Primary Examiner*—Bhavesh M Mehta
*Assistant Examiner*—Hadi Akhavannik

(57) ABSTRACT

Pattern matching can be achieved by considering only the position numbers of a source pattern and a target pattern within ordered sequences of possible source patterns and target patterns respectively. The position numbers of source patterns containing the target pattern form a number of groups. The number of source patterns within each group and the number of source patterns in the gaps between groups depend on the position of the target pattern within the source pattern, the length of the target pattern and the number of elements in the alphabet set. Each group also has a position number, its position within an ordered sequence of groups. The group position number of an input source pattern is compared to a series derived from the position number of the target pattern, the length of the target pattern and the number of elements in the alphabet set (9). If the group position number is a member of the series (10), then the source pattern contains the target pattern (11). Pattern matching can be performed on uncoded data or on arithmetic coded data.

26 Claims, 5 Drawing Sheets

| | | Target pattern '1' | Source pattern string **** | | Position number of target pattern = 2 |
|---|---|---|---|---|---|
| $P_t$ | Source data string | Row 4<br>1*** | Row 3<br>*1** | Row 2<br>**1* | Row 1<br>***1 |
| 1 | 0000 | | | | |
| 2 | 0001 | | | | 2 |
| 3 | 0010 | | | 3 | |
| 4 | 0011 | | | 4 | 4 |
| 5 | 0100 | | 5 | | |
| 6 | 0101 | | 6 | | 6 |
| 7 | 0110 | | 7 | 7 | |
| 8 | 0111 | | 8 | 8 | 8 |
| 9 | 1000 | 9 | | | |
| 10 | 1001 | 10 | | | 10 |
| 11 | 1010 | 11 | | 11 | |
| 12 | 1011 | 12 | | 12 | 12 |
| 13 | 1100 | 13 | 13 | | |
| 14 | 1101 | 14 | 14 | | 14 |
| 15 | 1110 | 15 | 15 | 15 | |
| 16 | 1111 | 16 | 16 | 16 | 16 |

Figure 1

Target pattern 'b'   Source pattern string ****   Position number of target pattern = 2

| Row 4 | Row 3 | Row 2 | Row 1 |
| b**** | *b** | **b* | ***b |

Row 4 (b****), Group 1: 126, 127, 128, ..., 250

Row 3 (*b**):
- Group 1: 26, 27, ..., 50
- Group 2: 151, 152, ..., 175
- Group 3: 276, 277, ..., 300
- Group 5: 526, 527, ..., 550

Row 2 (**b*):
- Group 1: 6, 7, ..., 10
- Group 2: 31, 32, ..., 35
- Group 3: 56, 57, ..., 60
- Group 25: 606, 607, ..., 610

Row 1 (***b):
- Group 1: 2
- Group 2: 7
- Group 3: 12
- Group 125: 622

Figure 3

METHOD AND SYSTEM FOR PATTERN MATCHING

FIELD OF THE INVENTION

The invention relates to pattern matching. Pattern matching is the process of finding some or all of the occurrences of a target pattern in a source pattern. Compressed pattern matching is the process of finding some or all of the occurrences of a target pattern in a compressed source pattern without decompressing the source pattern.

BACKGROUND OF THE INVENTION

Pattern matching is the application of analytical rules to a block of data to identify a feature of that block of data.

The most common pattern matching problem is the process of finding some or all occurrences of a sequence of elements [Y1 ... Ym] (target pattern) within a larger sequence of elements [X1 ... Xn] (source pattern). The elements come from a finite element set—an alphabet set. The set may be the English alphabet, {0,1}, natural numbers, etc. The most popular algorithms for this problem are the Knuth-Morris-Pratt algorithm, the Boyer-Moore algorithm and the Rabin-Karp algorithm.

There are a number of pattern matching tools in the public domain. The most prominent of these are the grep family.

Pattern matching is used for simple text search, searching for data in image data, speech data, video data, audio data, biomedical sequence analysis, etc.

Data compression is mainly used for reducing storage space and to speed up data transmission. Various forms of compression are known. Of particular interest is arithmetic coding compression for which compressed pattern matching has not heretofore been possible.

Arithmetic coding originated in the 1970s and 1980s (see for example U.S. Pat. No. 4,122,440). Arithmetic coding is used in several applications, including Speech and Medical Image compression.

In compressed pattern matching, the pattern matching is performed in the compressed domain. Succinctly put, compressed pattern matching of, for example, text strings can be stated as:

Let ac be a given compression algorithm, let ac(D) be the result of ac compressing data f)

Input: compressed text ac(T) and compressed pattern ac(P)

Output: all or some locations in T where pattern P occurs.

Amir and Benson ("Efficient Two-dimensional Compressed Matching", in *Proc. Second IEEE Data Compression Conference*, pp 279-288, March 1992) showed that complexity of pattern matching is reduced in the compressed domain compared to any conventional method in the uncompressed domain.

However, it has not been considered possible to perform pattern matching on "arithmetic codes" without decompressing that data ("TR-COSC 07/01 Pattern Matching in Compressed Texts and Images", by Tim Bell et al, Technical Reports, University of Canterbury, available at http://www-.cosc.canterbury.ac.nz/research/reports/TechReps/2001/tr_0107.pdf

SUMMARY OF THE INVENTION

It is an object of the present invention to provide a method of pattern matching suitable for matching arithmetic codes or to at least provide the public with a useful choice.

According to a first aspect of the invention there is provided a method of determining whether a target pattern is present within a source pattern composed of one or more characters from an alphabet set by determining whether the position of the source pattern within a sequence of possible patterns is a position which correlates with a position within the sequence of possible patterns that includes the target pattern.

According to a further aspect of the invention there is provided a method of determining whether a target sequence [X1 ... Xm] is present within a source sequence [Y1 ... Yq] where {X1 ... Xm} and {Y1 ... Yq} are members of a finite ordered set {Z1 ... Zo}, including the steps of:

i. constructing a set of source sub-sequence values in base o $\{[V_1], \ldots [V_1 \ldots V_k], \ldots [V_1 \ldots V_n]\}$ where $V_k=j$: $Y_k=Z_j$; and ii. determining whether any values of the set correspond to a series of target values $\{p, \ldots p+ko^m, \ldots p+no^m\}$ where p is the number $[D_1 \ldots D_n]$ in base o such that $D_k=h$: $X_k=Z_h$.

According to another aspect of the invention there is provided a data processing apparatus to determine whether a target pattern is present within a source pattern composed of one or more characters of an alphabet, comprising:

i. a first memory for storing a target pattern;
ii. a second memory for storing a source pattern;
iii. a processing means for determining the position of the source pattern in a sequence of possible patterns;
iv a processing means for determining the position of the target pattern in the sequence of possible patterns; and
v. a processing means for correlating the source position with the target position.

According to a further aspect of the invention there is provided a data processing apparatus to determine whether a target sequence is present within a source sequence composed of one or more characters of an alphabet, comprising:

i. a first memory for storing a target sequence position wherein the target sequence position is the position of the target sequence within a lexicon of all possible combinations of characters of the alphabet;
ii. a second memory for storing a source sequence position wherein the source sequence position is the position of the source sequence within the lexicon;
iii. a processing means for computing a set of positions of sub-sequences of the source sequence wherein the position of the sub-sequence is the position of the sub-sequence within the lexicon and wherein the sub-sequence includes the first character position of the source sequence;
iv. a processing means for determining a series defining all positions of sequences within the lexicon which contain the target sequence;
v. a processing means for correlating the set with the series.

BRIEF DESCRIPTION OF THE DRAWINGS

The invention will now be described by way of example with reference to the accompanying drawings, in which:

FIG. 1 is a chart of positions of source pattern strings of length 4, containing the target pattern '1', where the alphabet set is {0,1};

FIG. 3 is a chart of position numbers of source pattern strings of length 4, containing the target pattern 'b', where the alphabet set is {a,b,c,d,e};

DETAILED DESCRIPTION OF EMBODIMENTS OF THE INVENTION

Figure 2:
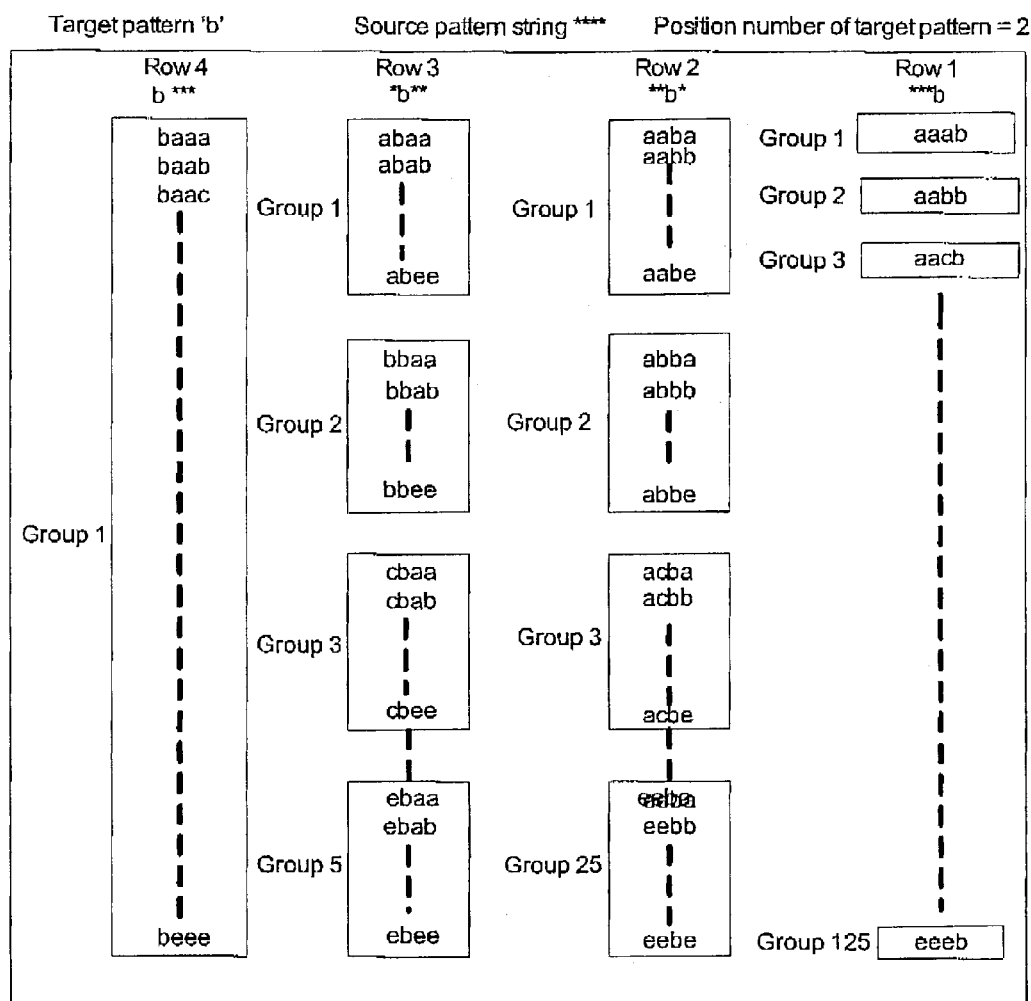
FIG. 2 is a chart of source pattern strings of length 4, containing the target pattern 'b', where the alphabet set is {a,b,c,d,e}.

The invention will be described in relation to examples where data could be either compressed or uncompressed.

Consider a source pattern string, t, and a target pattern string, p. These strings have lengths, $L_t$ and $L_p$ respectively, and we require that $L_t \geq L_p$ (note that the invention can be applied to strings of arbitrary length provided this condition is fulfilled). We define the position of the source pattern string, $P_t$, within an ordered series of source pattern strings. For example, for $L_t=4$ and with an alphabet set {a,b,c,d,e}, the first 11 source pattern strings and their positions in a lexically ordered set are shown in table 1.

TABLE 1

| Source pattern string | | | | | | | | | | |
|---|---|---|---|---|---|---|---|---|---|---|
| aaaa | aaab | aaac | aaad | aaae | aaba | aabb | aabc | aabd | aabe | aaca |
| $P_t$ 1 | 2 | 3 | 4 | 5 | 6 | 7 | 8 | 9 | 10 | 11 |

Similarly, we define the position of the target pattern string, $P_p$. For $L_p=1$, and with the same alphabet set {a,b,c,d,e}, the possible target pattern strings and their positions in a lexically ordered set are shown in table 2.

TABLE 2

| Target pattern String | | | | | |
|---|---|---|---|---|---|
| | a | b | c | d | e |
| $P_P$ | 1 | 2 | 3 | 4 | 5 |

The source pattern string could contain zero, one or several matches of the target pattern string.

FIG. 1 shows a simple scenario for the purpose of illustration. In FIG. 1 we begin with the alphabet set {0,1} and a source data length, $L_t$, of 4. The possible source pattern strings are then all binary numbers from 0000 to 1111. The positions of the source pattern strings in a numerically ordered set are also shown in the figure. Now consider pattern matches, with the target pattern '1'. In rows 1 to 4, the position numbers of source pattern strings satisfying the pattern match conditions are shown for the four possible target pattern positions within the source pattern string. For example, in row 4 the target pattern '1' occupies the first position in the source pattern string. This condition is satisfied for the binary numbers 1000 to 1111, which have position numbers from 9 to 16.

More generally, note that in a given row, the position numbers of source pattern strings where the target pattern occurs form one or several groups of successive numbers with breaks between groups. The number of elements in each group depends on the row, and hence the location of the target pattern within the source pattern string. In row 1, each group contains a single element, with a gap of 1 between each group. In row 3, each group contains 4 elements, with a gap of 4 between each group.

As will become apparent, the elements of row 1 form an arithmetic series, where the starting element, $b_0$, is equal to the position of the target pattern, $P_0$, and the difference is the number of elements in the alphabet set, N, raised to the power of the length of the target pattern (i.e. the number of elements in the target pattern), $L_p$:

$$b_m = b_0 + (m-1)N^{L_0} \quad \text{equation (1)}$$

We now define the highest position in each group as the group leader. Each row then has a group leader series. The group leader series of any row is related to the group leader series of an adjacent row by a factor of N, the number of elements in the alphabet set. We define the group leader series of row 1 as the root group leader series.

Figure 4:
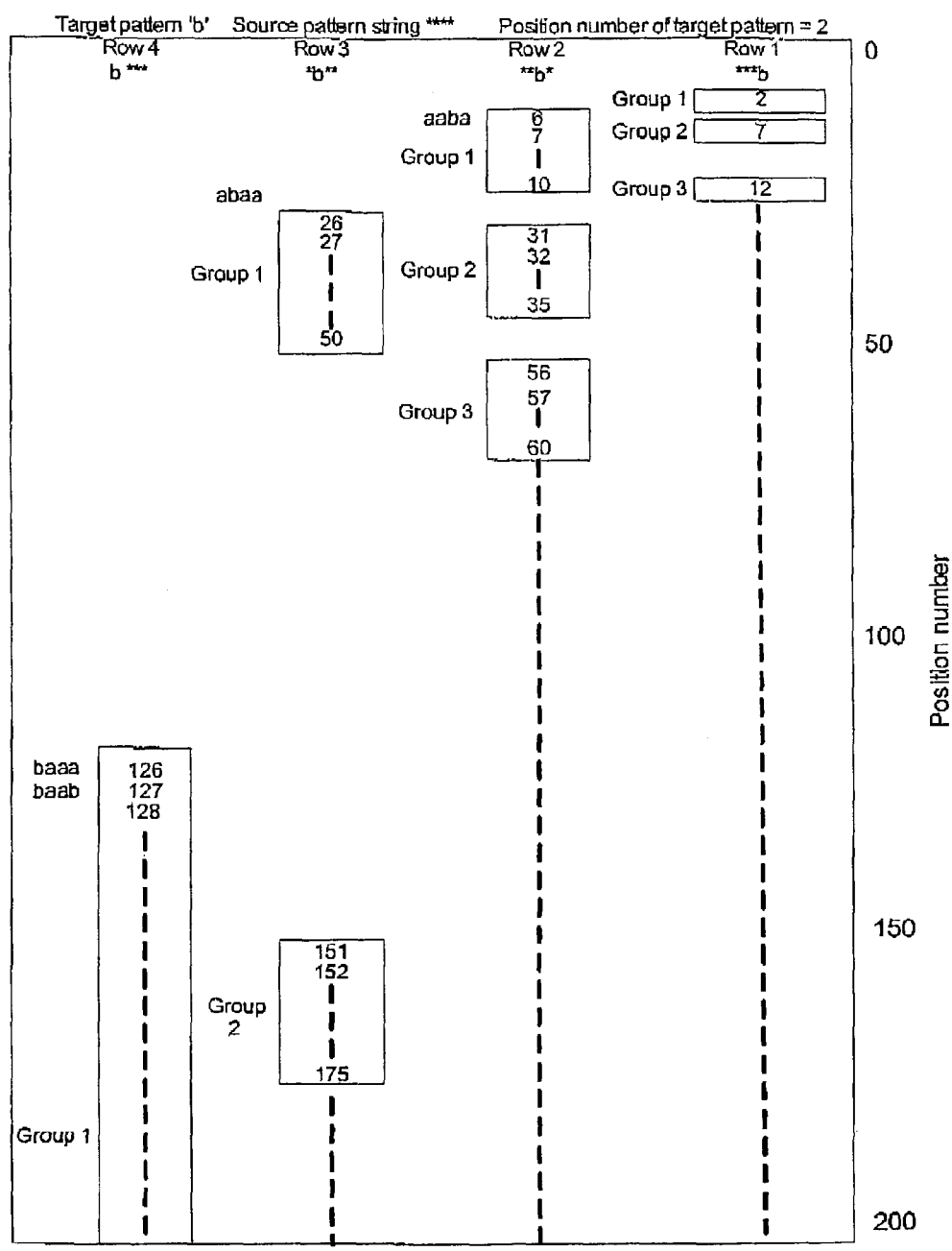
FIG. 4 is a chart as in FIG. 3, where the position numbers are set out to scale.

In FIGS. 2 to 4, we present a second scenario. We begin with the alphabet set {a,b,c,d,e} and a source data length, $L_1$, of 4. We wish to perform pattern matching, with the target pattern 'b'. The position number of the target pattern, $P_p$, is then 2. FIG. 2 shows all the potential source pattern strings which contain the target pattern 'b'. The dotted lines indicate that not all source pattern strings have been displayed in this area. FIG. 3 corresponds exactly to FIG. 2, except that the source pattern strings are represented by their position numbers. FIG. 4 corresponds to FIG. 3, except that a position number axis has been added, so that the position numbers are represented approximately to scale. From equation (1) above, the root group leader series can be represented by $$b_m = 2 + (m-1)5^1$$
$$= \{2, 7, 12, 17 \ldots\}$$

The group leader series of any of the rows is related to that of an adjacent row by a factor of N=5.

The possible group leaders for source data length of 4 and all possible target patterns of length $L_p=1$ are represented in table 3. Note that when the target pattern is 'b' (so $P_p=2$) only groups having a group leader position of {2, 7, 12, . . . } represent a pattern match. The corresponding columns in the table are shaded.

TABLE 3

| Group leader position (series) | 1 | | 3 | 4 | 5 | 6 | | 8 |
|---|---|---|---|---|---|---|---|---|
| Row1 group leader series | 1 | | 3 | 4 | 5 | 6 | | 8 |
| Row2 group leader series | 5 | | 15 | 20 | 25 | 30 | | 40 |

TABLE 3-continued

| | | | | | | | |
|---|---|---|---|---|---|---|---|
| Row3 group leader series | 25 | ■ | 75 | 100 | 125 | 150 | ■ 200 |
| Row4 group leader series | 125 | ■ | 375 | 500 | 625 | — (only 625 possible source pattern strings) | — — |

Figure 5:
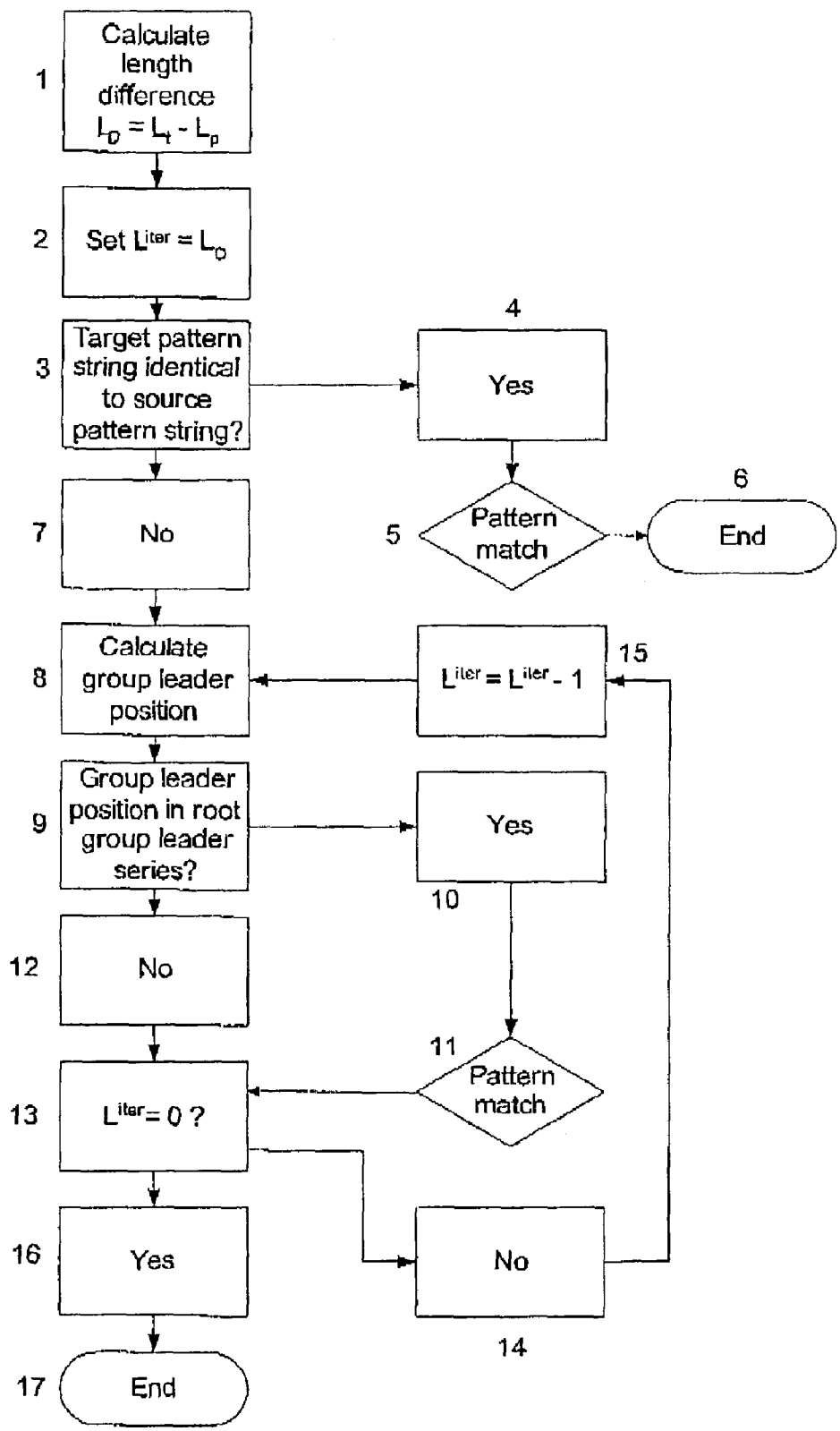
FIG. 5 is a flowchart showing the pattern matching algorithm.

The pattern matching algorithm will now be described with reference to FIGS. 3 and 5, in which the relevant step is indicated by bracketed numerals.

The algorithm searches for pattern matches at each possible target pattern position within the source pattern string, that is one row at a time. The number of rows is equal to 1 plus the difference in lengths between the source pattern string and the target pattern string, $L_t - L_p + 1 = L_D + 1$, where $L_D = L_t - L_p$ (1). We therefore define $L^{iter}$ (2) which is incremented or decremented by 1 to move one row at a time.

We calculate the position numbers of the source and target pattern strings. If $L_p$ equals zero and $P_t$ equals $P_p$, then the target pattern string is identical to the source pattern string (3). If so (4), then clearly we have one and only one pattern match (5) and the algorithm ends (6). Otherwise (7), we calculate the group leader position of the group including the source pattern string (8). This group leader position is then compared to the root group leader series (9). If the group leader position is not an element of the root group leader series (12) then processing proceeds to the next step (13). If the group leader position is an element of the root group leader series (10), then there is a pattern match in the corresponding row (11), if $L^{iter}$ does not equal zero (13, 14) the algorithm loops through the remaining rows by decrementing $L^{iter}$ (15), checking for pattern matches in each row. Once all of the rows have been checked, $L^{iter} = 0$ (13, 16), the algorithm ends (17).

It is apparent that this algorithm searches for all pattern matches in the source data. However, a similar algorithm could easily search for a single pattern match, ending immediately after a pattern match is found In this case, empirical knowledge of the strings involved could significantly speed up the algorithm. The sequence of searching may depend upon a characteristic of the source pattern string. If it were known a priori that the target pattern was likely to be contained towards the end of the source pattern string we should start with the assumption that the target pattern was contained in row 1 and move progressively one row at a time towards row ($L_D+1$). On the other hand, if the target pattern was likely to be contained towards the beginning of the source pattern string, we would move progressively from row ($L_D+1$) to row 1. Another similar algorithm could search for a pattern match at a particular position in the source pattern string. Alternatively the sequence of searching may be based upon an analysis of the source pattern string and occur according to the estimated probability for each row. It will be appreciated that a range of search sequences may be employed depending upon characteristics of the source data.

The step of calculating the group leader position, described above, can be achieved as follows. The position, $P_j$, of the lowest member of each possible group can be represented by:

$$P_j = 1 + (j-1)N^{r-1}$$

where $j = \{1, 2, 3 \ldots\}$, N is the number of elements in the alphabet and r is the row number.

Then $$(j-1) = (P_j - 1)/N^{r-1}$$

So that to find the group leader position, n, for a source pattern string of arbitrary position, $P_t$, $$n = 1 + \text{quotient}(P_t - 1)/N^{r-1}$$

The step of determining whether group leader position, n, is an element of the root group leader series can be achieved using this equation:

$$R = \text{remainder}((n - Pp)/N^{Lp})$$

where $P_p$ is the position of the target pattern within an ordered sequence of possible target patterns and $L_p$ is the number of elements in the target pattern.

It R=0, then the group leader position is an element of the root group leader series.

Example 1

An algorithm which performs the above steps is presented here in pseudo code
N—Number of elements in the alphabet.
T—A source pattern string.
P—A target pattern string.
$L_t$—Length of T.
$L_p$—Length of P.
$p_t$—Position number of T
$p_p$—Position number of P.
$R_h$—High value of the range of ac output for a particular string.
$R_l$—Low value of the range of ac output for a particular string.

```
function Pattern_match
{                                                              /* temporary variables */
    int L_iter, z, d, n, m, temp;
    L_d = L_t - L_p;
    L_iter = L_d;
    /* P_t & P_p are calculated from equation (2) given below */
    If (L_d=0) and (P_t = P_p)                                 /* equal length strings */
            Msg("Both match");
            Exit Function;
    /* Two Arithmetic series are given by a_n = a_0 + (n-1) and b_m = b_0 + (m-1)z */
    Loop for L_d + 1 times
    {
            /* find the source data's group leader position (n) in group arithmetic series */
            a_n = P_t;      a_0 = 1         d = power (N, L_iter)
            temp    = quotient ( (a_n - a_0) / d);
```

```
          n        = temp + 1;
          /* check if 'n' falls in the root group leader series */
          b_m = n;       b_0 = P_p;       z = power (N, L_p);
                 r = remainder ( (b_m − b_0)/z );
          if (r = 0)
               Msg ("pattern match success at position:" ((L_d + 1) − L_iter));
          L_iter = L_iter − 1;
     }           /*     Loop ends       */
}
```

We will now work through the algorithm using the example shown in FIGS. 2 to 4. Consider a source pattern string input, such that the position of the source data $P_t$=158.

Firstly we look for a pattern match in Row 4.

```
L^iter = L_t − L_p = 4−1 = 3
/* find the source data's group leader position (n) in group arithmetic series */
       a_n = P_t = 158      a_0 = 1       d = power (N, L_iter) = 5^3 = 125
       temp      = quotient ( (a_n − a_0) / d ) = quotient ((158−1)/125) = 1;
       n         = temp + 1 = 2;
    /* check if 'n' falls in the root group leader series */
            b_m = n = 2;        b_0 = P_p = 2;        z = power (N, L_p) = 5;
                r = remainder ( (b_m − b_0)/z ) = remainder ((2−2)/5) = 0;
                   r=0 therefore pattern match at position 1
```

Next we look for a pattern match in Row 3. If

```
L^iter = L^iter − 1 = 2
/* find the source data's group leader position (n) in group arithmetic series */
       a_n = P_t = 158      a_0 = 1       d = power (N, L_iter) = 5^2 = 25
       temp      = quotient ( (a_n − a_0) / d ) = quotient ((158−1)/25) = 6;
       n         = temp + 1 = 7;
    /* check if 'n' falls in the root group leader series */
            b_m = n = 7;        b_0 = P_p = 2;        z = power (N, L_p) = 5;
                r = remainder ( (b_m − b_0)/z ) = remainder ((7−2)/5) = 0;
                   r=0 therefore pattern match at position 2
```

Next we look for a pattern match in Row 2.

```
L^iter = L^iter − 1 = 1
/* find the source data's group leader position (n) in group arithmetic series */
       a_n = P_t = 158      a_0 = 1       d = power (N, L_iter) = 5^1 = 5
       temp      = quotient ( (a_n − a_0) / d ) = quotient ((158−1)/5) = 31;
       n         = temp + 1 = 32;
    /* check if 'n' falls in the root group leader series */
            b_m = n = 32;        b_0 = P_p = 2;        z = power (N, L_p) = 5;
                r = remainder ( (b_m − b_0)/z ) = remainder ((32−2)/5) = 0;
                   r=0 therefore pattern match at position 3
```

Lastly we look for a pattern match in row 1.

```
L^iter = L^iter − 1 = 0
/* find the source data's group leader position (n) in group arithmetic series */
       a_n = P_t = 158      a_0 = 1       d = power (N, L_iter) = 5^0 = 1
       temp      = quotient ( (a_n − a_0) / d ) = quotient ((158−1)/1) = 157;
```

-continued

```
        n       = temp + 1 = 158;
    /* check if 'n' falls in the root group leader series */
            b_m = n = 158;          b_0 = P_p = 2;      z = power (N, L_p) = 5;
            r = remainder ( (b_m − b_0)/z ) = remainder ((158−2)/5) = 1;
                    r ≠ 0 therefore NOT a pattern match at position 4
```

Where the target pattern consists of multiple characters the same algorithm may be employed.

In arithmetic codes, a string is represented by an interval on a number line. The size of the interval is determined by the probabilities of the symbols of the alphabet. In the equiprobable case, it is a simple matter to calculate the position number of a string:

$$P = R_h/(R_h - R_l) \quad \quad \text{equation (2)}$$

where $R_h$ is the highest value of the interval and $R_l$ is the lowest value of the interval.

In the case where different elements of the alphabet have different probabilities, the position number can still be determined, although this is not as straightforward as in the equiprobable case. We take into account the probabilities of each element of the alphabet set and the length of the source pattern to establish the position number that corresponds to the interval of interest. So, when operating on arithmetically compressed data, the position number of a coded interval is calculated. This position number, together with the target pattern's position number, becomes the input to the above algorithm.

Example 2

The source sequence can be represented as a position in a list of all possible combinations of the elements of the alphabet with the length of the source sequence—the source lexicon. The source sequence itself is in fact that position when represented in base n (n is the number of elements in the alphabet) where the elements of the alphabet represent digits in base n.

A set of the positions of all sub-sequences of the source sequence, which include the first character position of the source sequence, within a lexicon of all possible combinations of the elements of the alphabet with the length of the sub-sequence, can be computed. The set will contain the following elements: the first digit of the source sequence in base n, the first digit and the second digit, the first digit and the second and the third, and so on for the length of the source sequence position in base n.

Within the source lexicon, "words" containing the target sequence are n to the power of the length of the target sequence apart. Using the position of the first "word" containing the target sequence, a series of positions of "words" containing the target sequence can therefore be defined.

The set and the series needed to be rendered in the same base and then a correlation procedure can be run to see if any of the possible target sequence positions are equivalent to the source sub-sequence positions.

If the set is ordered from smallest element to largest, the position of the element in the set which also matches with the target series describes the position in the source sequence of the rightmost element of the target sequence.

Of course the set of source subsequence positions may be matched against the series of possible target positions in O(n) by using the remainder equation.

Thus it may be determined whether a target sequence $[X_1 \ldots X_m]$ is present within a source sequence $[Y_1 \ldots Y_q]$ where $\{X_1 \ldots X_m\}$ and $\{Y_1 \ldots Y_q\}$ are members of a finite ordered set $\{Z_1 \ldots Z_o\}$, by;

i. constructing a set of source sub-sequence values in base o $\{[V_1], \ldots [V_1 \ldots V_k], \ldots [V_1 \ldots V_n]\}$ where $V_k = j$ $Y_k = Z_j$; and ii. determining whether any values of the set correspond to a series of target values $\{p, \ldots p+ko^m, \ldots p+no^m\}$ where p is the number $[D_1 \ldots D_n]$ in base o such that $D_k = h$: $X_k = Z_n$.

To determine whether any values of the set correspond to the series in step ii the result for the following algorithm must be zero for that value of the set:

$$R = \text{remainder}((N-p)/o^m)$$

Where:

N = a member of the set in base 10

The method can be implemented using a range of standard data processing devices or specialised graphics audio processing or sequencing devices. For example the method may be deployed on a personal computer operating under the MICROSOFT WINDOWS™ environment or on a server machine operating under the UNIX operating system.

It will be appreciated that the method may be implemented in software executing on a device or implemented in specialised hardware.

It will be further appreciated by those skilled in the art that method may be deployed in portions over a multiple of computers or servers.

It is believed that the present invention represents the first method for pattern matching of arithmetically compressed source data without decompression of the data. The invention can also operate using a compressed target pattern string. The invention should be of immense utility at arithmetic decoder stations, where the decoder could typically check for partial or full matches with any prior strings of data.

The invention can be used to find all pattern matches, one pattern match or a pattern match at a particular position in the source pattern string. The invention can also be executed in parallel, as a search on a particular interval can be performed independently of searches on other intervals. That is, the invention can be applied to more than one source string at the same time. The invention could also operate in a decentralised system, for example a search engine accessible over a communications network.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described.

Accordingly, departures may be made from such details without departure from the spirit or scope of the Applicant's general inventive concept.

The invention claimed is:

1. A method of identifying whether a target pattern is present within a source pattern composed of one or more characters from an alphabet set, comprising:
   determining, using a processing apparatus, whether the position of the source pattern within a sequence of possible patterns is a position which correlates with a position within the sequence of possible patterns that includes the target pattern, wherein determining comprises:
   i. identifying the group leader for the source pattern where the group leader is the highest position number in each group formed by dividing a sequence of possible position numbers into groups according to the base of the alphabet set; and
   ii. determining whether the group leader value of the source pattern is a group leader value that correlates with the position of the target pattern within the sequence of possible patterns that includes the target pattern, wherein the group leader value of the source pattern is determined directly or indirectly for each row by dividing an ascending sequence of possible position numbers into groups having a group size corresponding to the base of the alphabet set raised to the power of the row less one, where the row corresponds to a position of the target pattern within the source pattern.

2. A method as claimed in claim 1 wherein a group leader position is used to determine whether the group leader value is valid for the target pattern and where the group leader position is the position of the group leader's group amongst the groups for that row.

3. A method of identifying whether a target pattern is present within a source pattern composed of one or more characters from an alphabet set, comprising:
   determining, using a data processing apparatus, whether the position of the source pattern within a sequence of possible patterns is a position which correlates with a position within the sequence of possible patterns that includes the target pattern, wherein determining comprises:
   i. identifying the group leader for the source pattern where the group leader is the highest position number in each group formed by dividing a sequence of possible position numbers into groups according to the base of the alphabet set; and
   ii. determining whether the group leader value of the source pattern is a group leader value that correlates with the position of the target pattern within the sequence of possible patterns that includes the target pattern,
   wherein the group leader position for the source pattern is calculated according to the following algorithm:

$N = 1 + \text{Quotient}((Sp-1)/b^{r-1})$

Where:
   N=source pattern group leader position number
   Sp=Source pattern position number
   b=alphabet base
   r=row number.

4. A method as claimed in claim 3 wherein to determine whether there is a match in step ii the result for the following algorithm must be zero:

$R = \text{remainder}((N-Tp)/b^{Tl})$

Where:
   R=the remainder
   Tp=the target pattern position number
   Tl=the length of the target pattern.

5. A method as claimed in claim 1 wherein there are a number of rows and the method is applied consecutively to each row.

6. A method as claimed in claim 1 wherein the method is applied to more than one source pattern simultaneously.

7. A method as claimed in claim 1 wherein the order in which the rows are searched is dependent on a characteristic of the source pattern.

8. A method as claimed in claim 1 wherein the probability of finding the target pattern in a row is estimated and is used to determine the order in which the rows are searched.

9. A method as claimed in claim 1 wherein the probability of finding the target pattern in a row is known and is used to determine the order in which the rows are searched.

10. A method as claimed in claim 1 wherein the source pattern is arithmetic coded data.

11. A method as claimed in claim 10 wherein the target pattern is arithmetic coded data.

12. A method as claimed in claim 10 wherein the source pattern is compressed using arithmetic coding.

13. A method as claimed in claim 11 wherein the target pattern is compressed using arithmetic coding.

14. A method as claimed in claim 1 wherein the target pattern has more than one element.

15. A method as claimed in claim 1 wherein the source pattern sequence is image data.

16. A method as claimed in claim 1 wherein the source sequence pattern is video data.

17. A method as claimed in claim 1 wherein the source pattern is bio-medical data.

18. A data processing apparatus to determine whether a target pattern is present within a source pattern composed of one or more characters of an alphabet set, comprising:
    a first memory for storing a target pattern:
    a second memory for storing a source pattern;
    a processing means for determining the position of the source pattern in a sequence of possible patterns;
    a processing means for determining the position of the target pattern in the sequence of possible patterns;
    a processing means for identifying the group leader for the source pattern, where the group leader is the highest position number in each group formed by dividing a sequence of possible position numbers into groups according to the base of the alphabet set; and
    a processing means for correlating the source position with the target position by determining whether the group leader value of the source pattern is a group leader value that correlates with the position of the target pattern within the sequence of possible patterns that includes the target pattern, wherein the group leader value of the source pattern is determined directly or indirectly for each row by dividing an ascending sequence of possible position numbers into groups having a group size corresponding to the base of the alphabet set raised to the power of the row less one, wherein the row corresponds to a position of the target pattern within the source pattern.

19. A data processing apparatus as claimed in claim 18 wherein the source sequence pattern is image data.

20. A data processing apparatus as claimed in claim 18 wherein the source pattern is video data.

21. A data processing apparatus as claimed in claim 18 wherein the source pattern is bio-medical data.

22. A data processing apparatus as claimed in claim 18 wherein the processing means is a computer system.

23. Non-transitory computer readable medium embodying a computer program which, when executed on the processing apparatus, performs the method of claim 1.

24. Non-transitory computer readable medium embodying a computer program which, when executed on the data processing apparatus, performs the method of claim 3.

25. Pattern matching information produced by the method of claim 1.

26. Pattern matching information produced by the method of claim 3.

* * * * *

UNITED STATES PATENT AND TRADEMARK OFFICE
CERTIFICATE OF CORRECTION

PATENT NO. : 7,840,072 B2
APPLICATION NO. : 10/386462
DATED : November 23, 2010
INVENTOR(S) : Sriram K. N. V. Kumar et al.

Page 1 of 1

It is certified that error appears in the above-identified patent and that said Letters Patent is hereby corrected as shown below:

In column 12, line 31, in Claim 15, after "pattern" delete "sequence".

In column 12, line 33, in Claim 16, before "pattern" delete "sequence".

In column 12, line 65, in Claim 19, before "pattern" delete "sequence".

Signed and Sealed this
Seventeenth Day of May, 2011

David J. Kappos
*Director of the United States Patent and Trademark Office*